US012679694B2

(12) United States Patent
Duss et al.

(10) Patent No.: US 12,679,694 B2
(45) Date of Patent: Jul. 14, 2026

(54) MOBILE CONTROL UNIT AND METHOD FOR REMOTELY CONTROLLING AN ELEVATOR INSTALLATION

(71) Applicant: Inventio AG, Hergiswil (CH)

(72) Inventors: Reto Duss, Ebikon (CH); Steve Ineichen, Buchrain (CH); Roman Ott, Goldau (CH); Andreas Weier, Alpnach Dorf (CH); David Zumsteg, Buochs (CH)

(73) Assignee: INVENTIO AG, Hergiswil (CH)

( * ) Notice: Subject to any disclaimer, the term of this patent is extended or adjusted under 35 U.S.C. 154(b) by 1109 days.

(21) Appl. No.: 17/755,154

(22) PCT Filed: Oct. 27, 2020

(86) PCT No.: PCT/EP2020/080162
§ 371 (c)(1),
(2) Date: Apr. 22, 2022

(87) PCT Pub. No.: WO2021/083884
PCT Pub. Date: May 6, 2021

(65) Prior Publication Data

US 2022/0363513 A1 Nov. 17, 2022

(30) Foreign Application Priority Data

Oct. 31, 2019 (EP) .................................... 19206624

(51) Int. Cl.
*B66B 5/00* (2006.01)
*B66B 1/34* (2006.01)

(52) U.S. Cl.
CPC .......... *B66B 5/0087* (2013.01); *B66B 1/3446* (2013.01); *B66B 5/0025* (2013.01); *B66B 5/0031* (2013.01)

(58) Field of Classification Search
CPC ... B66B 5/0087; B66B 1/3446; B66B 5/0025; B66B 5/0031; B66B 1/3415; B66B 1/40; B66B 5/00
See application file for complete search history.

(56) References Cited

U.S. PATENT DOCUMENTS 10,227,208 B2 * 3/2019 De Coi ................. B66B 5/0031
11,072,515 B2 * 7/2021 Witczak ................ B66B 1/3461
(Continued)

FOREIGN PATENT DOCUMENTS

CN 101472830 A 7/2009
CN 104024138 A 9/2014
(Continued)

*Primary Examiner* — Bickey Dhakal
(74) *Attorney, Agent, or Firm* — Shumaker, Loop & Kendrick, LLP

(57) ABSTRACT

A mobile control unit and a method remotely control an elevator installation in an inspection mode, wherein the elevator installation includes an elevator car, an elevator controller and a safety circuit. The elevator controller automatically controls the elevator car for movement in a normal mode of the elevator installation when the safety circuit is electrically closed. In order to control the elevator installation, the mobile control unit is connected to the elevator installation such that the mobile control unit can switch the elevator installation between the normal mode and the inspection mode, and the elevator car can be manually controlled for movement via the mobile control unit in the inspection mode of the elevator installation.

15 Claims, 3 Drawing Sheets

(56) References Cited

U.S. PATENT DOCUMENTS

| | | | | |
|---|---|---|---|---|
| 2002/0117358 | A1 | 8/2002 | Schoppa et al. | |
| 2009/0321192 | A1 | 12/2009 | Kattainen et al. | |
| 2014/0247531 | A1 | 9/2014 | Madar | |
| 2014/0277613 | A1* | 9/2014 | Love | A63J 1/02 700/83 |
| 2018/0186602 | A1 | 7/2018 | Herkel et al. | |
| 2019/0300336 | A1 | 10/2019 | Witczak et al. | |
| 2020/0207572 | A1* | 7/2020 | Jarugubilli | B66B 1/3461 |

FOREIGN PATENT DOCUMENTS

| | | | |
|---|---|---|---|
| CN | 105793182 | A | 7/2016 |
| CN | 105829232 | A | 8/2016 |
| CN | 105899449 | A | 8/2016 |
| CN | 110027959 | A | 7/2019 |
| EP | 2727875 | A1 | 5/2014 |
| EP | 2927174 | A1 | 10/2015 |
| JP | 2005178949 | A | 7/2005 |
| JP | 2007031082 | A | 2/2007 |
| JP | 2007137617 | A | 6/2007 |
| JP | 2011195205 | A | 10/2011 |
| JP | 2014218330 | A | 11/2014 |
| JP | 2016141527 | A | 8/2016 |
| JP | 2017165521 | A | 9/2017 |
| JP | 2019104593 | A | 6/2019 |
| WO | 2008072023 | A1 | 6/2008 |
| WO | 2017008849 | A1 | 1/2017 |

* cited by examiner

MOBILE CONTROL UNIT AND METHOD FOR REMOTELY CONTROLLING AN ELEVATOR INSTALLATION

FIELD

The present invention relates to a mobile control unit and to a method for remotely controlling an elevator (also called as lift) installation in its inspection mode, and to an elevator installation that can be controlled using such a mobile control unit or method.

BACKGROUND

An elevator installation is used to transport people via an elevator car within buildings, specifically between different floors. In order to be able to ensure the safety of passengers or service personnel, the elevator installation must be inspected and serviced regularly or periodically. For maintenance or to carry out inspection and maintenance work, an elevator installation must be put into an inspection or maintenance mode in which the elevator car may travel only via manual control at a walking speed and possibly only between certain positions within the elevator shaft. In order to switch the elevator installation into the inspection mode, a service technician usually has to first enter the elevator shaft via a shaft door or maintenance hatch, since a control device, e.g. a control unit, is located in the shaft and is available to manually control the elevator car during maintenance work. This control device can be switched on or off by a changeover switch, usually referred to as an inspection switch. After completing the maintenance work, the inspection/maintenance mode can be ended by deactivating this control device. In addition, if such a control device is arranged as a fixed inspection control unit, according to the EN81-20 standard, on the roof of the elevator car and in the shaft pit of an elevator installation, the mobility of the technician during inspection/maintenance work is limited only inside the shaft, namely either on the roof of the elevator car or in the shaft pit.

During the control of the elevator installation, all safety-relevant current states of a number of components of the elevator installation, in particular a so-called safety chain, should be monitored. The safety chain is also referred to as a safety circuit and constitutes the entirety of the electrical safety devices connected in series, such as the door contacts, latch contacts or contacts of the safety gear. If one of these safety switches is interrupted, the entire chain is considered to be broken and the elevator must not travel. Only when the safety chain as a whole is closed can the elevator controller move the elevator car in the elevator shaft. After the maintenance/inspection work, the elevator installation can be switched back into regular travel mode (normal mode) by switching the control device in the shaft into the normal mode and closing or locking the shaft door and, consequently, closing the safety chain.

In view of the above explanation, a technician can put an elevator installation into the inspection mode only when he enters the elevator shaft through a shaft door and has reached the control device. However, during the time in which the technician is in the elevator shaft but does not yet have the control device in hand, the elevator car could suddenly move despite the presence of the technician. As a rule, a so-called emergency shut-off switch is therefore located in the shaft next to the shaft door, but usually only on the ground floor. An emergency shut-off switch is used to bring an elevator installation to a standstill immediately in the event of danger or to avert a hazard; however, a technician either occasionally forgets to press the emergency shut-off switch or fails to do so due to inconvenience, because otherwise he has to return to the shaft after activating the control device and release the pressed emergency shut-off switch again. Such a dangerous scenario is to be avoided in any case.

SUMMARY

One aspect of the present invention can be considered to be that of ensuring the occupational safety of an elevator installation, in particular during maintenance/inspection work. Among other things, there may be a need for a larger and flexible operating zone for service technicians, which allows maintenance/inspection work to be carried out conveniently but also safely.

Such a need as mentioned above can be met by the subject matter of the advantageous embodiments that are defined in the following description.

According to the invention, a mobile control unit for remotely controlling an elevator installation in an inspection mode is provided, the elevator installation comprising an elevator car, an elevator controller and a safety circuit, which is usually also referred to as a safety chain of the elevator installation. The elevator controller can be e.g. a central main controller of the elevator installation which processes a request signal from a control panel (COP: car operation panel or LOP: lobby operation panel) and controls the movement of the elevator car accordingly, or a subordinate special controller. Therefore, the elevator controller can automatically control the elevator car for movement in a normal mode of the elevator installation when the safety circuit is electrically closed. Of course, if the safety circuit is electrically interrupted, the elevator car will be blocked from moving. To control the elevator installation, the mobile control unit can be connected to the elevator installation in such a way that the mobile control unit can switch the elevator installation into the normal mode and/or inspection mode, and such that the elevator car can be manually controlled by the mobile control unit for movement in the inspection mode.

Automatic control of the elevator car means that the elevator controller executes an algorithm or program, and thus performs one or more process operations of the elevator car, after a triggered start signal, which can be a signal generated outside or inside the elevator. Manual control in this case means that the elevator installation responds only to a current manipulation by a person via a switch (e.g. button or knob), which directly causes the elevator car to move, and after the manipulation (after releasing the button or knob) the response of the elevator installation or the movement of the elevator car also ends. Typically, an elevator car travels at a higher travel speed or greater acceleration under automatic control, and travels only at a low travel speed or smaller acceleration under manual control.

A technician can then manually control the elevator car for movement in the inspection mode of the elevator installation by operating the mobile control unit. When the elevator installation is switched into the normal mode, the mobile control unit can be disconnected from the elevator installation. It is then no longer necessary for an inspection control unit to be available on the roof of the elevator car and/or in the shaft pit. The inspection control unit(s) can be replaced by the mobile control unit. In other words, the mobile control unit can be used functionally in place of a local inspection control unit. It is thus possible to switch an elevator installation over to its inspection mode without a technician having to enter the shaft of the elevator installation in particular. Even if a local inspection control unit has already been set up in the shaft of an elevator installation, it does not need to be removed. In this case, the mobile control unit can also take over the responsibility of the inspection control unit that is already present, namely the control of the elevator installation in the inspection mode. However, if the local inspection control unit has an emergency shut-off switch or emergency shut-off function, this switch or switch function can continue to function alongside the mobile control unit. Such a takeover can take place automatically if e.g. a higher priority is assigned to the mobile control unit than the inspection control unit. Alternatively, this takeover can be initiated manually using the mobile control unit if a communication connection is first established between the mobile control unit and the elevator controller. For safety reasons, an emergency shut-off switch can be left on the roof of the elevator car and/or in the shaft pit instead of an inspection control unit, even if the inspection control unit is no longer required there. If the mobile control unit fails or causes a fault, the emergency shut-off switch can be used to interrupt the drive of the elevator installation or the movement of the elevator car in an emergency.

According to an advantageous embodiment of the invention, the safety circuit can be designed as an electrical series connection which consists of at least one safety element of the elevator installation in order to be able to block movement of the elevator car when the series connection is electrically interrupted. The mobile control unit can be assigned to the safety circuit as an additional safety element. If a current flow or current path through the safety circuit is electrically interrupted, the control from the mobile control unit to the elevator installation is also interrupted. The safety element is e.g. a car/shaft door contact, latch contact or contact of a safety gear. If the mobile terminal is connected to the safety circuit as an additional safety element, the mobile control unit is also electrically connected in series to the other safety element(s) of the safety circuit. This provides a real-time system in which the mobile control unit can communicate with the safety circuit in real time. In this case, the mobile control unit can simulate a relay contact e.g. by means of a button on its own or a dedicated software module (dedicated module or apps).

According to an advantageous embodiment of the invention, the safety circuit can be formed by a bus system, such as a wired or wireless bus system, in particular a CAN (Controller Area Network) bus system, and the mobile control unit can be assigned to the safety circuit as a bus node. The connection can be realized e.g. by a software module. A real-time system for controlling the elevator installation in the inspection mode is also provided by the bus system. The elevator controller can monitor a switching state of the safety circuit or the mobile control unit. If the switching state indicates a fault or an unsafe situation, the elevator controller can prevent the elevator car from moving.

Irrespective of how the safety circuit is designed in terms of an electrical circuit or a bus system, the safety circuit and/or the mobile control unit can also be connected by wire, wirelessly or via the bus system for data communication with the elevator controller. This means that a technician in the shaft can always communicate with the elevator installation in real time anywhere and anytime using the latest information.

According to an advantageous embodiment of the invention, the position of the mobile control unit can be determined by the elevator controller. The mobile control unit can be positioned by near field communication (NFC) such as RFID technology (radio-frequency identification) or Bluetooth communication, and the mobile control unit may communicate with the elevator controller with the aid of other components or sensor systems of the elevator installation or via the bus system if the distance between the elevator controller and the mobile control unit is too far for direct communication. Alternatively, it may be necessary to scan a QR code of a component (e.g. sensors or tags) of the elevator installation with the mobile control unit during inspection/maintenance work after a certain time or periodically, as a result of which the position of a technician in the shaft can be determined.

According to a further advantageous embodiment of the invention, the mobile control unit can communicate with a wireless or mobile communication network, the mobile control unit being e.g. a mobile radio device. As a result, communication can be established between the mobile control unit and a remote control center or a server or cloud server. It is then possible for a service technician to receive or download all the necessary documentation or information on-site at an elevator installation. In addition, he can send collected data or a prepared test report to a remote control center. This could help with a remote diagnosis for the elevator installation. The mobile control unit can be provided with a display for displaying e.g. the downloaded information. For this purpose, other information determined by the elevator controller or the safety circuit can also be displayed.

According to a further advantageous embodiment of the invention, the mobile control unit can comprise a switching means for switching the elevator installation between the normal mode and the inspection mode, the switching means being an electromechanical means and/or a software function (e.g. an app or a menu item). An example of an electromechanical means is a simple rotary switch. A combined rotary/pressure switch, a pressure switch, or a toggle switch which are connected in series are also possible. If the display of the mobile control unit is a touch screen, a representation of a button corresponding to the switching means is provided on the touch screen. In addition, the mobile control unit can be provided with an emergency shut-off means. This emergency shut-off means can be designed in the same way as the switching means of the mobile control unit. Thus, a technician can always implement a safety measure during his increased mobility in the shaft.

According to another aspect of the invention, a method for controlling an elevator installation is proposed in which the elevator installation has an elevator controller and an elevator car and a safety circuit. In a normal mode the elevator installation is automatically controlled by the elevator controller when the safety circuit is electrically closed. If the safety circuit is electrically interrupted, the elevator car is blocked from moving. To control the elevator installation, the mobile control unit is connected to the elevator installation in such a way that the elevator installation is switched by the mobile control unit between the normal mode and/or the inspection mode, with the elevator car being manually controlled by the mobile control unit for movement in the inspection mode of the elevator installation.

According to a third aspect of the invention, an elevator installation is provided which has at least one elevator controller and an elevator car and a safety circuit, with the elevator controller being able to automatically control the elevator car for movement in a normal mode of the elevator installation, and it being possible for the elevator installation to be switched between the normal mode and/or an inspection mode of the elevator installation by an above-described mobile control unit, and the elevator car being manually controllable by the mobile control unit for movement in the inspection mode.

It should be noted that some of the possible features and advantages of the invention are described herein with reference to different embodiments. A person skilled in the art will recognize that the features can be suitably combined, adapted or replaced in order to arrive at further embodiments of the invention.

Embodiments of the invention will be described below with reference to the accompanying drawings, with neither the drawings nor the description being intended to be interpreted as limiting the invention.

DETAILED DESCRIPTION

Figure 1:
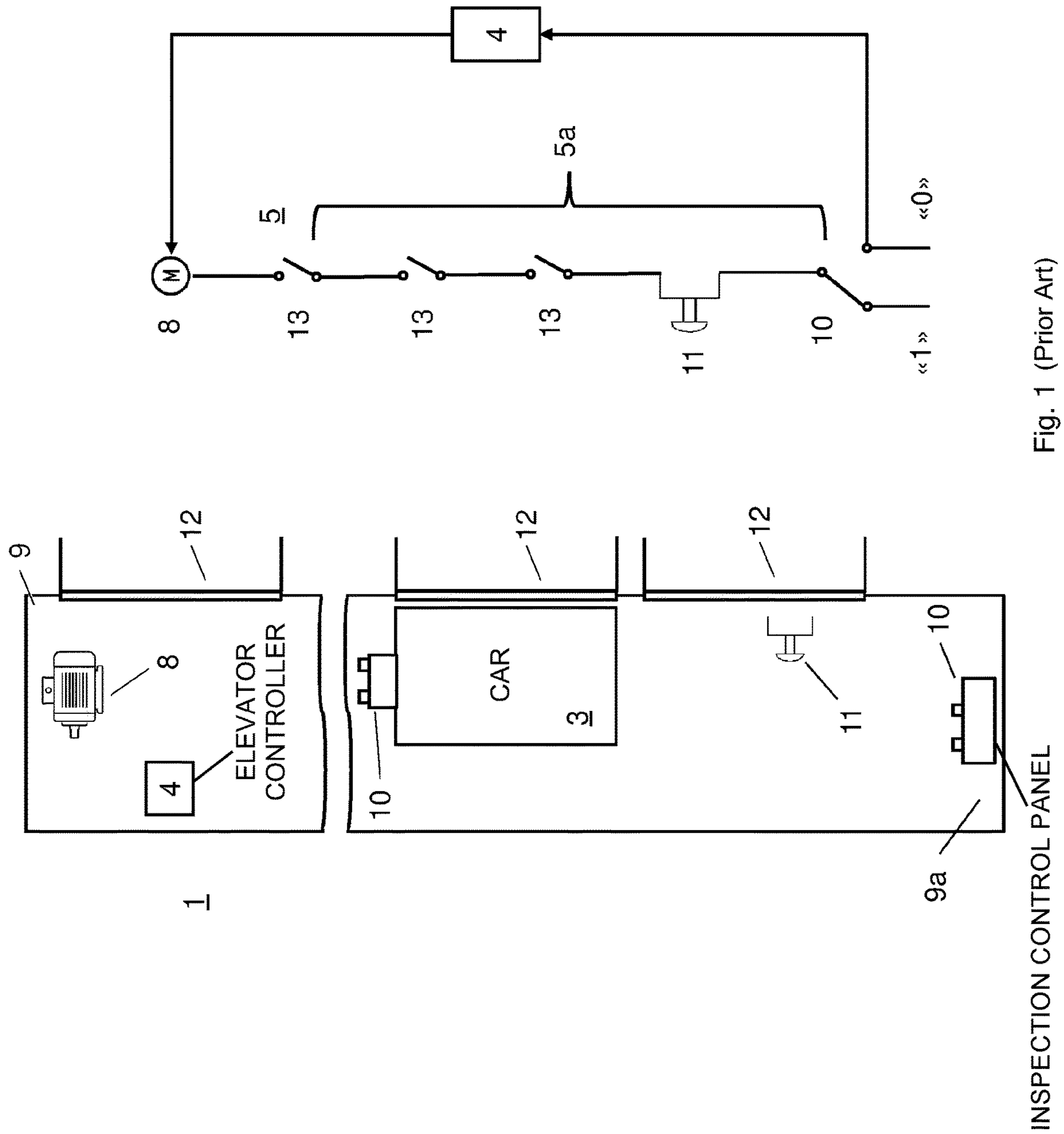
Fig. 1 (Prior Art)
FIG. 1 shows an elevator installation with two conventional inspection panels.

FIG. 1 shows an elevator installation 1 installed in a building with multiple floors. The elevator installation 1 has a safety circuit 5 which is shown in detail on the right-hand side of the schematically shown elevator installation 1. An electric motor 8 drives an elevator car 3 to move in an elevator shaft 9 under the control of an elevator controller 4 such as a main controller of the elevator installation 1. A shaft door 12 is provided on each floor and a car door (not shown) is provided on the elevator car 3. The shaft door 12 can be opened or closed alone or together with the car door. A door switch 13 is provided on each of the shaft doors 12 and on the car door (not shown), by means of which door switches 13 it can be monitored whether the relevant shaft door or car door 12 is currently correctly closed or open.

An inspection control panel 10 is available to a technician (not shown) in the shaft 9 for inspection/maintenance work, allowing the technician to switch the elevator installation 1 into an inspection mode and then to manually control the elevator car 3 via the electric motor 8 for movement. In this case, a switching position "1" is assigned for the inspection mode and a switching position "0" is assigned for the normal mode, for example. Depending on what elevator standard (e.g. EN 81-20) has to be met, two inspection control panels 10 can also be provided; one on the roof of the elevator car 3 and one in the shaft pit 9*a*. For this purpose, at least one emergency shut-off switch 11 is provided in the shaft 9 and is located e.g. on an inner wall of the shaft 9—often close to a shaft door 12 on the ground floor—or on the roof of the elevator car 3 in order to immediately interrupt the operation of the elevator installation and consequently block the elevator car 3 from moving.

Typically, the door switches 13 of the shaft door and the car door 12 and the emergency shut-off switch 11 are connected in series as safety elements 5*a*, as a result of which a formed safety circuit 5 is closed as a safety chain as a whole only if all door switches 13 are closed and the emergency shut-off switch 11 is not released. Since all the safety elements 5*a* are coupled to the safety chain 5, when one of the safety elements 5*a* is opened the elevator car 3 is blocked from moving. If a door switch 13 is opened, the movement of the elevator car 3 is considered unsafe and the controller 4 shuts it down.

Figure 2:
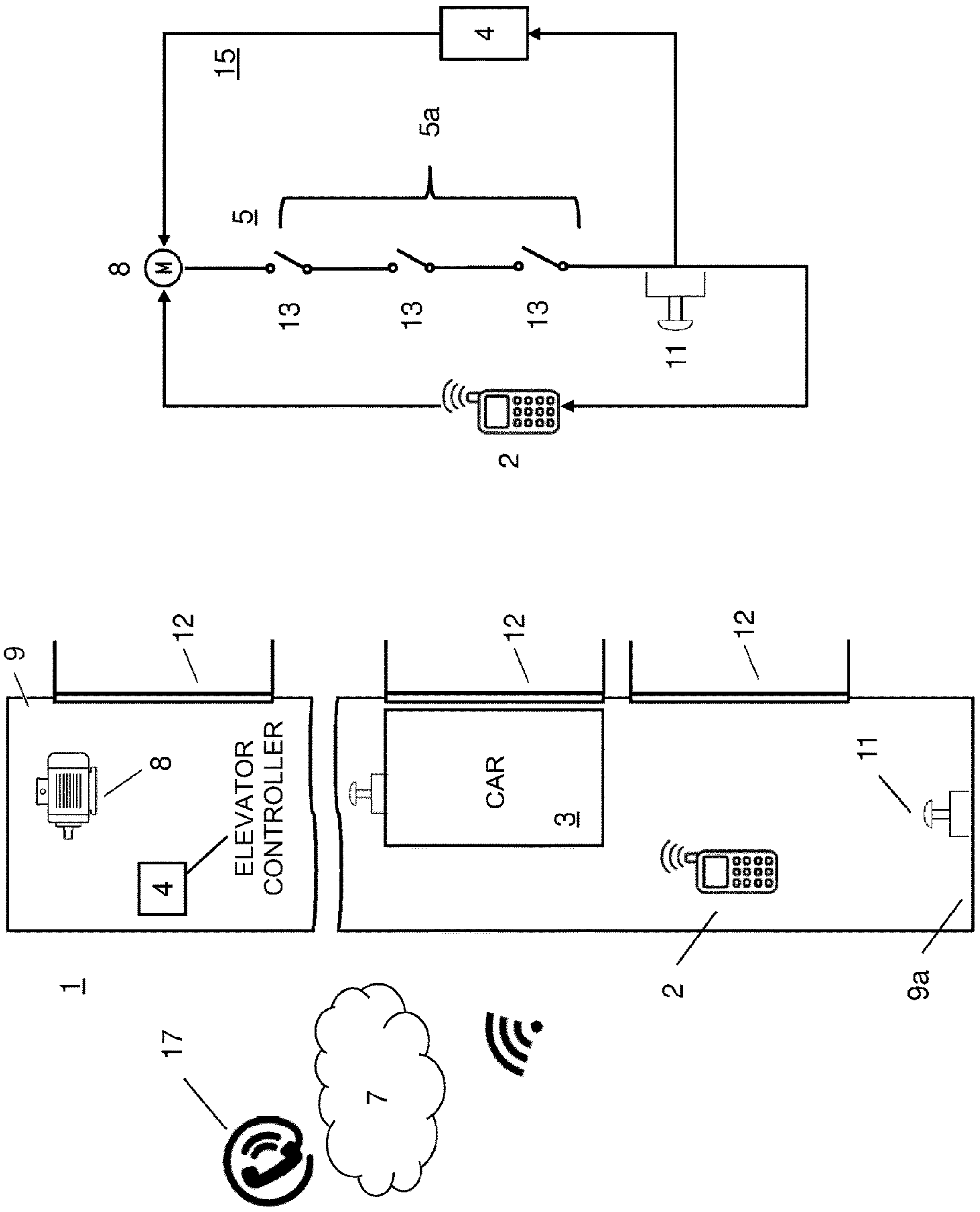
FIG. 2 shows an elevator installation with a mobile control unit according to the invention.

In FIG. 2, a mobile control unit 2 according to the invention for controlling or remotely controlling an elevator installation 1—as shown in FIG. 1—is shown in an inspection mode. The mobile control unit 2 is e.g. a mobile telephone or a smartphone, a laptop, a tablet computer or any portable communication device. Instead of the two inspection control panels 10 in the shaft pit 9*a* and on the roof of the elevator car 3, the elevator installation 1 can be put into an inspection mode and then switched back to a normal mode by the mobile control unit 2 both outside and inside the shaft 9. It is then no longer necessary to still provide an inspection control unit 10 in the shaft 9. Thus, it is no longer necessary for the technician to make an effort to first reach the inspection control unit 10 in the shaft in order to put the elevator installation 1 into the inspection mode. However, only one emergency shut-off switch 11 could be left on the roof of the elevator car 3 and/or in the shaft pit 9*a* so that the technician can interrupt the safety circuit 5 in an emergency despite a faulty control of the mobile control unit 2. If an elevator installation 1 still has an inspection control unit 10, for safety reasons the function of the existing inspection control unit 10 should be taken over by the mobile control unit 2 if this elevator installation 1 is actually to be serviced or inspected by the mobile control unit 2. An emergency shut-off switch or an emergency switch function of the inspection control unit 10 can continue to function independently of the mobile control unit 2. The takeover of the function of the inspection control unit 10 can be manually manipulated and operated by the mobile control unit 2, for example, after a communication link has been established between the mobile control unit 2 and the elevator controller 4 and the elevator controller 4 authorizes this takeover.

In this embodiment, the safety circuit 5 and the elevator controller 4 are connected via a bus system 15 such as a CAN bus system, with the mobile control unit 2 being connected to the bus system 15 as a bus node. The elevator installation 1 can be switched into the normal or inspection mode by sending a message from the mobile control unit 2 to the elevator controller 4. In addition, the bus system 15 monitors the safety circuit 5. If any safety element 5*a* of the safety circuit 5 is opened, the elevator car 3 is immediately blocked from moving. The mobile control unit 2 cannot control the elevator car 3 until the safety circuit 5 is closed again. And the elevator controller 4 can determine the position of the mobile control unit 2 or the technician e.g. by means of NFC communication, for example RFID. If the elevator installation 1 is switched into the normal mode, the mobile control unit 2 is disconnected from the bus system 15 or the elevator installation 1. The elevator controller 4 then takes over the control of the elevator installation 1 again from the mobile control unit 2.

In addition, the mobile control unit 2 is connected to a public communication network 7, thereby establishing communication between the mobile control unit 2 and a remote control center or server 17. The technician can then download information from the server 17 or communicate with the remote control center 17 on-site at an elevator installation 1.

Figure 3:
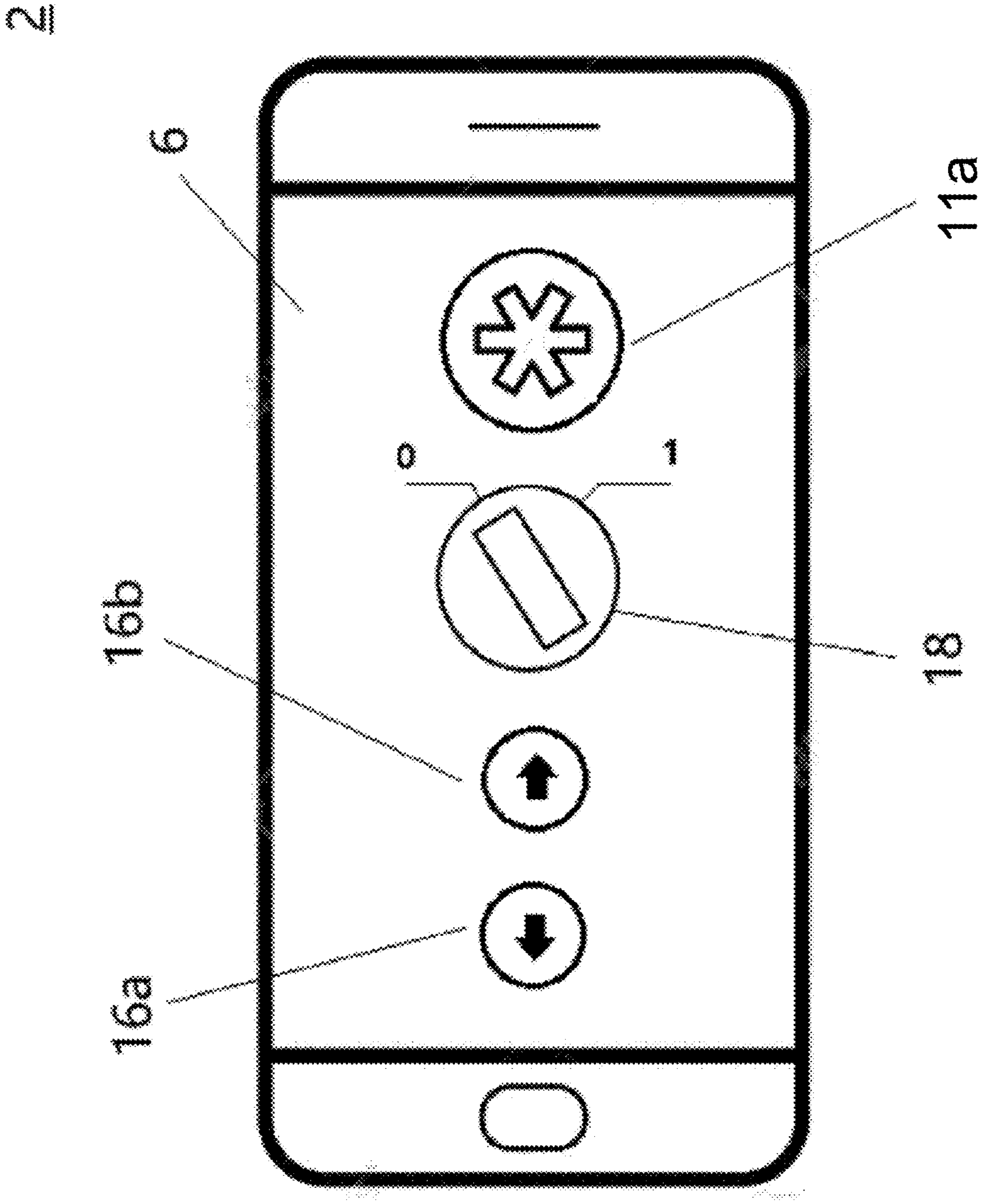
FIG. 3 is a front view of a mobile control unit according to the invention.

FIG. 3 shows a mobile control unit 2 according to the invention. In this case, the mobile control unit 2 has a display 6 which can display e.g. the downloaded information or the information determined by the elevator controller 4 or the safety circuit 5. The mobile control unit 2 also comprises a changeover switch 18. In order for a technician to be able to manually control the elevator car 3 for movement, the operating mode of the elevator installation 1 must first be switched over from "normal mode" to "inspection mode" using the changeover switch 18. In this case, for example, a switching position "0" is provided for the normal mode and a switching position "1" is provided for the inspection mode. By actuating two direction buttons 16*a*, 16*b*, one for the upward and one for the downward direction, the mobile control unit 2 can be used to control the elevator car 3 in a corresponding direction for movement. There is also an emergency shut-off switch 11*a* in the mobile control unit 2 which functions the same as the emergency shut-off switch 11 of FIGS. 1-2 in order to be able to immediately interrupt an operation of the elevator installation 1. The various switches of the mobile control unit 2, such as the switches 11*a*, 16*a*, 16*b* and 18, can be designed either as electromechanical switches (e.g. buttons or knobs) or application software (app) or a graphical menu item on a user interface for the mobile control unit 2.

In summary, embodiments of the mobile control unit 2 presented here and a method allow for switching and remote control of an elevator installation 1 into an inspection mode, while safely providing increased mobility for a technician in the shaft.

It should be noted that possible features and advantages of embodiments of the invention are described herein partly with reference to a method according to the invention and partly with reference to a device according to the invention. A person skilled in the art will recognize that the individual features can be combined, modified, or exchanged in a suitable manner and that features described in particular for the method can be transferred analogously to the device and vice versa in order to arrive at further embodiments of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A mobile control unit for remotely controlling an elevator installation in an inspection mode, the elevator installation including an elevator car, an elevator controller and a safety circuit, the safety circuit being an electrical series connection including at least one safety element of the elevator installation that blocks the elevator car from moving when the series connection is electrically interrupted, the elevator controller automatically controlling the elevator car movement in a normal mode of the elevator installation when the safety circuit is closed, the mobile control unit comprising:

the mobile control unit adapted to connect to the elevator installation wherein the mobile control unit switches the elevator installation between the normal mode and the inspection mode, wherein the mobile control unit when connected to the elevator installation enables manual control of movement of the elevator car in the inspection mode of the elevator installation; and the mobile control unit when connected to the elevator installation is assigned as a further safety element to the series connection, wherein the control of movement by the mobile control unit is interrupted when the safety circuit is interrupted.

2. The mobile control unit according to claim 1 wherein the safety circuit is formed by a wired or wireless bus system and the mobile control unit is connected to the safety circuit as a bus node.

3. The mobile control unit according to claim 2 wherein the bus system is a CAN (Controller Area Network) bus system.

4. The mobile control unit according to claim 1 wherein a position of the mobile control unit is determined by the elevator controller.

5. The mobile control unit according to claim 1 wherein the mobile control unit communicates with a wireless or mobile communication network for connection to the elevator controller.

6. The mobile control unit according to claim 1 wherein the mobile control unit has a display for displaying information related to the elevator installation.

7. The mobile control unit according to claim 1 wherein the mobile control unit includes a changeover switch for switching the elevator installation between the normal mode and inspection mode, the changeover switch being at least one of an electromechanical switch, an application software and a user interface menu item.

8. The mobile control unit according to claim 1 including an emergency shut-off switch for interrupting operation of the elevator installation.

9. An elevator installation comprising:

an elevator controller;

a safety circuit;

an elevator car wherein the elevator controller automatically controls the elevator car for movement in a normal mode of the elevator installation when the safety circuit is electrically closed; and a mobile control unit according to claim 1 for controlling the elevator installation in an inspection mode of the elevator installation.

10. A method for remotely controlling an elevator installation having an elevator controller, an elevator car and a safety circuit, wherein the elevator car is automatically controlled by the elevator controller for movement in a normal mode of the elevator installation when the safety circuit is electrically closed, the method comprising the steps of:

connecting a mobile control unit to the elevator installation;

operating the mobile control unit to switch the elevator installation between the normal mode and an inspection mode and manually controlling movement of the elevator car by the mobile control unit in the inspection mode; and wherein the safety circuit is an electrical series connection of at least one safety element of the elevator installation, the safety circuit blocking the elevator car from moving when the series connection is electrically interrupted, and assigning the mobile control unit as an additional safety element to the series connection such that the connection between the mobile control unit and the elevator installation is interrupted when the safety circuit is interrupted.

11. The method according to claim 10 wherein the safety circuit is a wired or wireless bus system.

12. The method according to claim 11 wherein the safety circuit is a CAN (Controller Area Network) bus system.

13. The method according to claim 10 including determining a position of the mobile control unit by the elevator controller.

14. The method according to claim 10 including wherein the mobile control unit communicates with a wireless or mobile communication network.

15. The method according to claim 10 wherein the mobile control unit includes an emergency shut-off switch actuatable for interrupting operation of the elevator installation.

* * * * *